C. I. J. RICHARDSON & L. FELDMAN.
AUTOMATIC CLUTCH CONTROL.
APPLICATION FILED FEB. 26, 1913.
1,102,226.
Patented June 30, 1914.
3 SHEETS—SHEET 1.
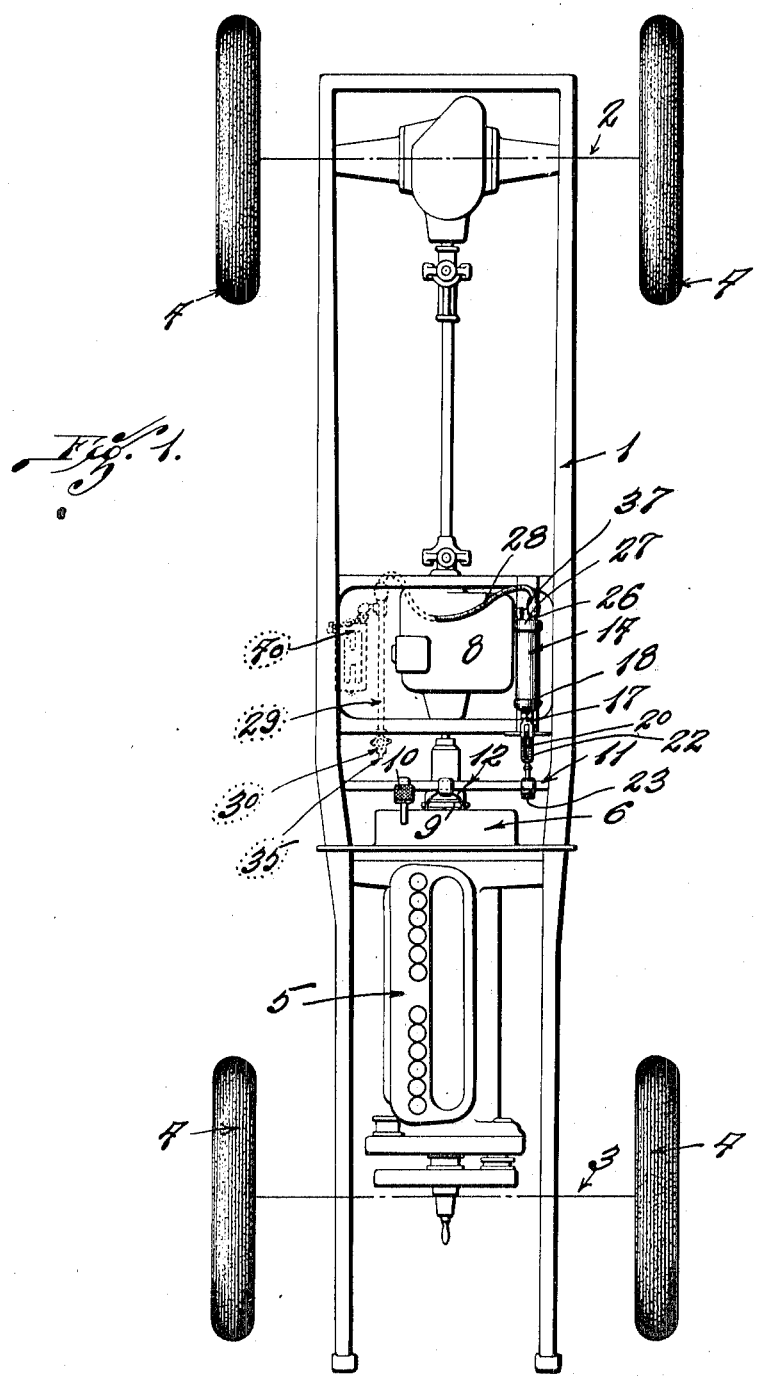

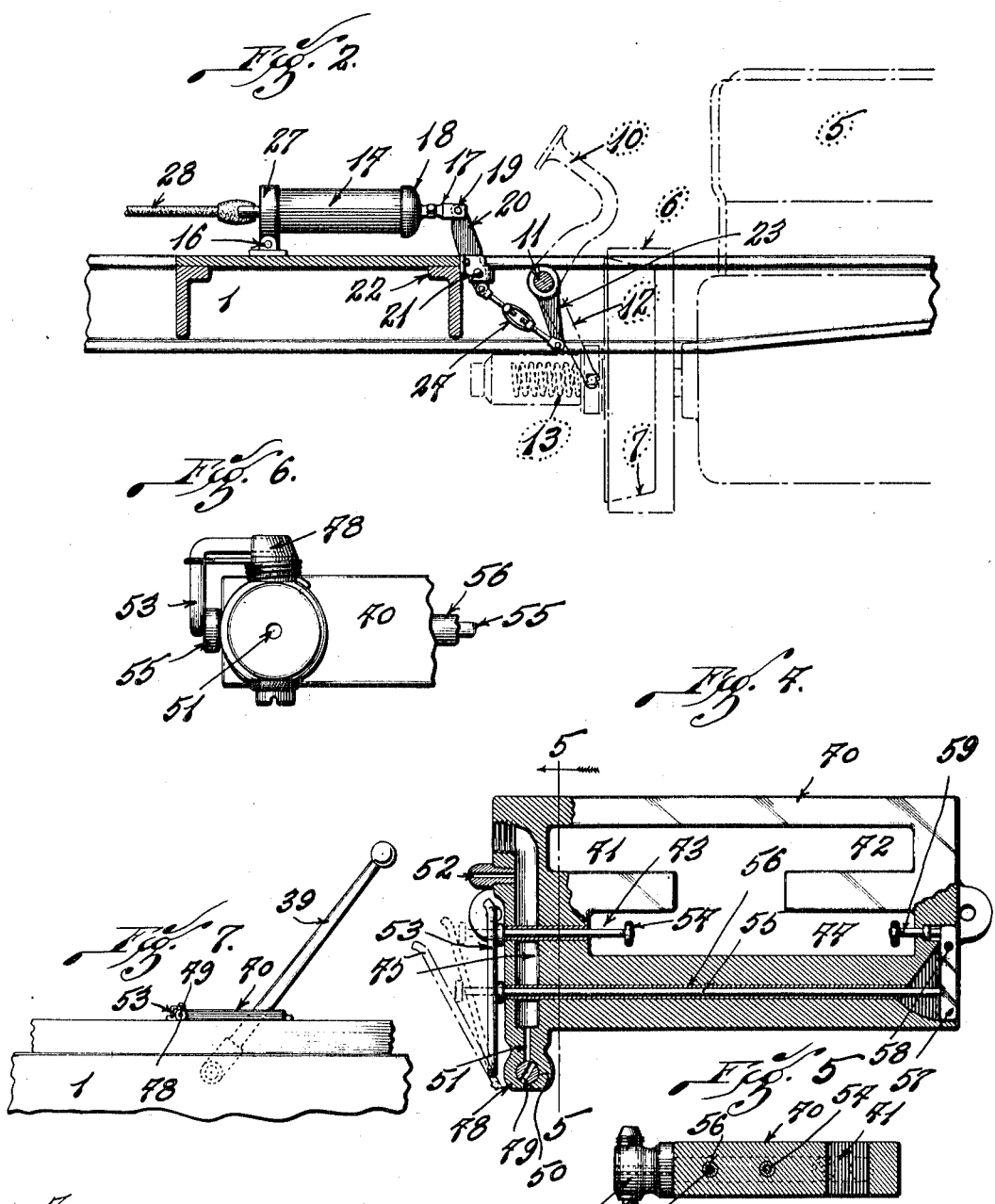

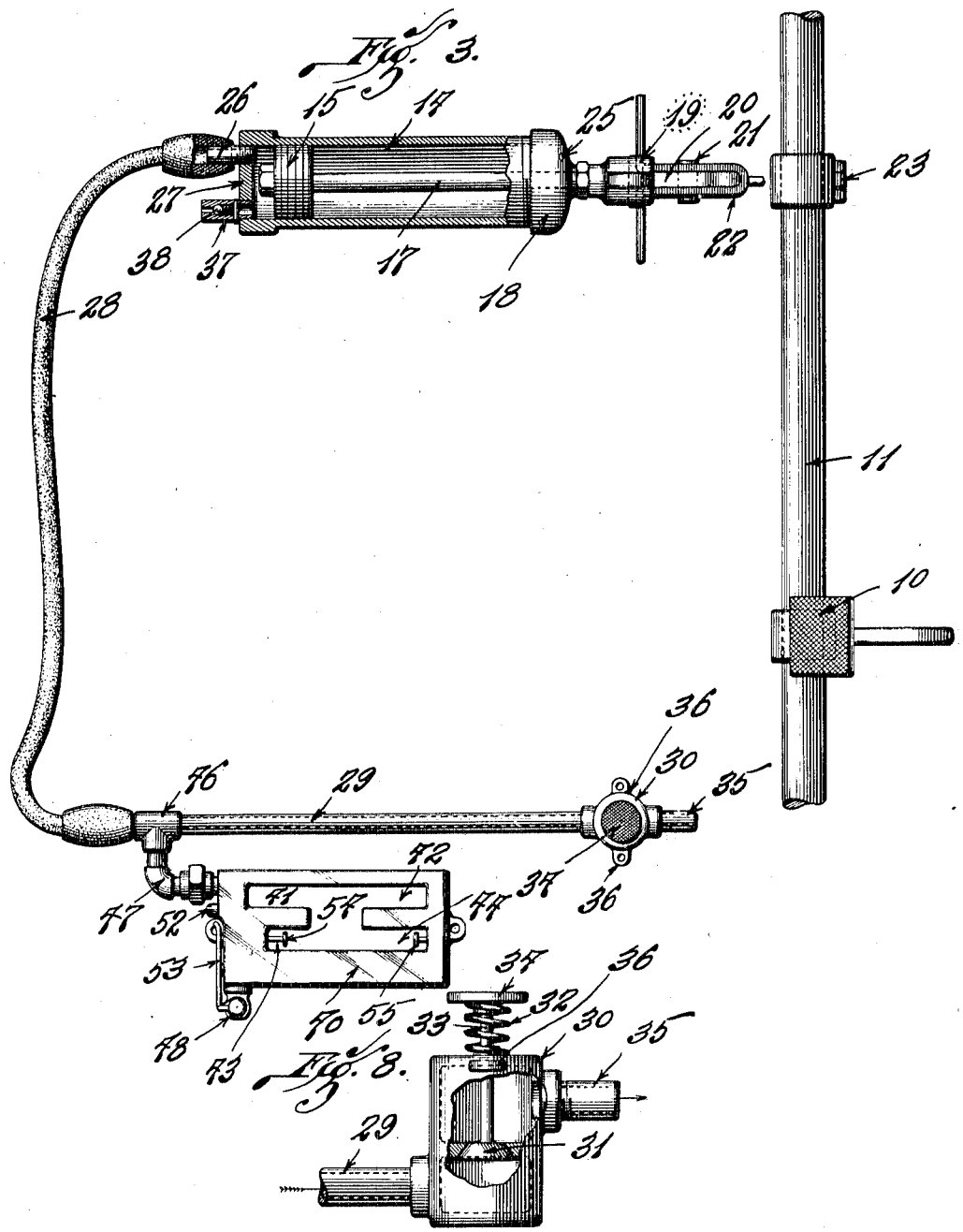

UNITED STATES PATENT OFFICE.

CHARLES I. J. RICHARDSON AND LOUIS FELDMAN, OF ST. LOUIS, MISSOURI.

AUTOMATIC CLUTCH CONTROL.

1,102,226.  Specification of Letters Patent.  Patented June 30, 1914.

Application filed February 26, 1913. Serial No. 750,773.

*To all whom it may concern:*

Be it known that we, CHARLES I. J. RICHARDSON and LOUIS FELDMAN, citizens of the United States, and residents of St. Louis, Missouri, have invented certain new and useful Improvements in Automatic Clutch Controls, of which the following is a specification containing a full, clear, and exact description, reference being had to the accompanying drawings, forming a part hereof.

Our invention relates to a device which we have named an automatic clutch control for automobile clutches, and the invention consists in the novel construction hereinafter described and specifically pointed out in the appended claims.

The object of our invention is to provide an improved means which shall prevent the inurious "jerks" which have heretofore taken place when an automobile clutch is quickly applied in starting the automobile from a state of rest. Heretofore a great annoyance has been experienced by the occupants of automobiles when the clutch has been quickly applied, and not only have the occupants of the automobile been greatly annoyed by the sudden starting or forward "jerking" of the automobile, but in numerous cases the sudden jerk has stripped some of the gears and done other damage to the machine.

In the drawings: Figure 1 is a top plan view of an automobile chassis having our invention applied thereto; Fig. 2 is a sectional side elevation of a portion of the chassis, illustrating the relative positions of the clutch, clutch pedal and the cushion cylinder; Fig. 3 is a sectional plan view of the clutch pedal shaft, cushion cylinder and the change speed-lever guide-plate; Fig. 4 is a sectional plan view of the change speed-lever guide-plate; Fig. 5 is a vertical section through said guide-plate taken on the line 5—5 of Fig. 4; Fig. 6 is a detail side elevation of the valve end of said guide-plate; Fig. 7 is a side elevation of a portion of the chassis frame having the change speed-lever and its guide-plate in position thereon; and Fig. 8 is a detail view of a foot-operated relief valve.

The numeral 1 indicates the usual automobile chassis frame supported by the usual rear axle 2, front axle 3 and wheels 4.

The numeral 5 indicates the usual engine or motor having the usual fly wheel 6, the clutch 7, and change speed-gear 8.

The numeral 9 indicates any common form of clutch now used in connecting the motor to the change speed-gear.

The numeral 10 indicates the usual clutch-pedal mounted on the usual pedal-shaft 11 in the customary bearings upon the automobile frame. Extending from the clutch pedal-shaft 11 is the usual bifurcated clutch-arm 12 used for releasing the clutch 9 in opposition to the power of the usual clutch-spring 13.

The numeral 14 indicates the cushion cylinder having a common piston 15 which is adapted to compress within said cylinder a fluid (preferably air), for the purpose of cushioning the application of the clutch 9. Said cylinder 14 is pivotally mounted at one end on a bracket 16 so that said cylinder may slightly oscillate during operation. Connected to the piston 15 is a piston rod 17 which extends through an opening in a cylinder head 18 and is pivotally connected at 19 to a rock-lever 20. Said rock-lever 20 is pivoted at 21 to a suitable bracket 22 mounted upon the chassis frame, so that one end of said rock-lever 20 projects downwardly in position to be pivotally connected to a pedal-arm 23, the free end of said pedal-arm being connected to the lower end of the rock-lever 20 by means of a turnbuckle 24. The cylinder head 18 is provided with an exit aperture 25 to permit the free entrance and exit of air to the interior of the cylinder upon the piston rod side of the piston. The fluid (which is preferably air although it may, of course, be any known gas or liquid) is compressed by the piston 15, in applying the clutch 9 and is driven through and out of the cylinder through a pipe-connection 26 mounted in the cylinder head 27, and passes through any suitable tubular connection, such as a flexible hose 28 and a pipe 29 to a foot-operated relief-valve casing 30. Within the relief-valve casing 30 is a common valve 31 which is normally held in a closed position by a spring 32 coiled around the valve stem 33. Said valve stem 33 projects through an aperture in the casing 30 and has upon its upper end a button 34 which is preferably depressed by the foot, although it is obvious that said relief-valve may be located at any convenient point upon the automobile.

The inner end of the spring 32 bears upon the valve casing 30, while its outer end bears upon the button 34.

35 indicates the discharge pipe of said relief-valve. Said relief-valve casing 30 may be secured to any desired part of the vehicle by means of perforated ears 36 through which screws are to be passed. Located upon the cylinder head 27 is a common check-valve casing 37 in which operates a common check-valve 38.

The operation of the graduating mechanism just described in detail should be obvious, as the fluid compressed behind the piston 15 in applying the clutch 9 prevents any sudden application of the clutch, and to permit a rapid application of the clutch it will be necessary for the operator to open the relief-valve 31 by means of its button 34. The operator may, of course, quickly relieve the pressure by fully opening said valve, so that the clutch whenever desired may be suddenly applied should such action be necessary in crowded thoroughfares.

We will now proceed to describe the graduating mechanism whereby the compressed fluid behind the piston 15 may be automatically relieved, either suddenly or gradually, depending upon the position of the change speed-lever.

The numeral 39 indicates the usual change speed-lever mounted in the customary manner and connected with the change speed-gear 8.

40 indicates the change speed-lever guide-plate having the usual guiding slots 41, 42, 43 and 44 which are engaged by the said change speed-lever in changing the automobile to different speeds or in reversing. Formed within one end of said guide-plate 40 is a passage 45 which is placed in communication with the flexible tube 28 by means of a T 46 and pipe connections 47, thereby connecting said passage 45 to the compression space of the cushion cylinder 14.

48 indicates a common rocking-plug valve having the usual port 49 and mounted in the valve-seat 50 formed on said guide-plate. The port 49 of the plug valve 48 is adapted to be placed in communication with the passage 45 by means of a reduced passage 51, so that air from said passage 45 may be discharged through said plug valve whenever the latter is so positioned that its port registers with said passage 51. The outer end of the passage 51 opens to atmosphere.

52 indicates a normal fluid-discharge port which is connected to the said passage 45 for the purpose of permitting fluid to be gradually discharged in applying the clutch under normal conditions, such for instance as when the change speed-lever 39 is located within the low speed slot 41, and when the said lever is located in the "reverse" slot 42. The said plug 48 is rotated by means of a lever 53 which projects laterally from the upper end of said plug valve on the exterior of the valve-seat 50, and said lever 53 is bent downwardly at a right angle and thence inwardly parallel with the end of the said guide-plate 40, so that it may be engaged consecutively by the second speed plunger 54 and high speed plunger 55. The plungers 54 and 55 are mounted to slide loosely in a guide-tube 56, which extends across said passage 45. The high speed plunger 55 is not contacted directly by the change speed-lever, but is engaged by a rock-lever 57 pivoted at 58, so that one end of said rock-lever 57 will be engaged by a short plunger 59 one end of which projects into the high speed slot 44.

The operation of the mechanism just described is as follows: When the operator desires to apply the clutch while on the low speed or reverse, he releases the clutch-pedal 10 and the clutch-spring 13 will gradually apply the clutch 9 and the piston 15 will compress the fluid within said cylinder 14 and force such fluid through the flexible tube 28 to the T 46 and pipe connections 47 to the passage 45 in the guide-plate. A portion of the air will escape through the normal fluid discharge port 52 and thereby permit the clutch to be applied gradually. When the change speed-lever 39 is placed in the second speed slot 43 it will automatically (without mental effort on the driver's part) come in contact with the second speed plunger 54 and force said plunger outwardly into contact with the plug-valve lever 53, and thereby slightly rotate and open the automatic relief valve which is the plug-valve and permit an additional quantity of air to be automatically relieved and discharged through said plug-valve allowing the clutch to be applied more quickly. When the speed-lever 39 is placed in the high speed slot 44 it will come in contact with the high speed plunger 59 and force said plunger outwardly into contact with the rock-lever 57, which in turn will force outwardly the high speed plug 55, and said plug will contact with the plug-valve lever 53 and open said plug-valve to a greater extent, as indicated by dotted lines in Fig. 4, so that the clutch may be quickly applied.

We do not limit ourselves to the exact form or location of the parts as it is obvious that a skilled workman may make many changes without departing from the scope of our invention.

We claim:

1. In combination with an automobile clutch, a change speed lever, a cylinder, a piston in said cylinder, a mechanical connection between said piston and a movable member of said clutch, a relief valve connected to said cylinder, and a mechanical connection between said change speed lever and said relief valve, whereby the latter will be automatically opened whenever said change speed lever is moved to make a change to a higher speed.

2. In combination with an automobile clutch, a cylinder, a piston in said cylinder, a mechanical connection between said piston and a movable member of said clutch, and a relief-valve controlled by movement of the change speed lever for releasing the pressure of fluid in said cylinder more rapidly as the said change speed lever is moved to make a change to a higher speed.

In testimony whereof, I have signed my name to this specification, in presence of two subscribing witnesses.

CHAS. I. J. RICHARDSON.
LOUIS FELDMAN.

Witnesses:
E. L. WALLACE,
JOHN C. HIGDON.